(12) United States Patent
Ota et al.

(10) Patent No.: US 9,454,719 B2
(45) Date of Patent: Sep. 27, 2016

(54) PRINT CONTROL APPARATUS, PRINT CONTROL METHOD, AND NON-TRANSITORY COMPUTER READABLE MEDIUM

(71) Applicant: FUJI XEROX CO., LTD., Tokyo (JP)

(72) Inventors: Takuya Ota, Kanagawa (JP); Yuki Hara, Kanagawa (JP); Masatomo Igarashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/644,851

(22) Filed: Mar. 11, 2015

(65) Prior Publication Data

US 2015/0294199 A1  Oct. 15, 2015

(30) Foreign Application Priority Data

Apr. 14, 2014 (JP) .................................. 2014-082830

(51) Int. Cl.
*G06F 15/00* (2006.01)
*G06K 15/02* (2006.01)
*G06T 1/00* (2006.01)

(52) U.S. Cl.
CPC ............. *G06K 15/1856* (2013.01); *G06T 1/00* (2013.01); *G06K 15/1848* (2013.01); *G06K 2215/0082* (2013.01)

(58) Field of Classification Search
CPC .................................................. G06K 15/1806
USPC ......................................................... 358/1.15
See application file for complete search history.

(56) References Cited

U.S. PATENT DOCUMENTS

| 2009/0185224 | A1* | 7/2009 | Akahane | G06K 15/005 |
| | | | | 358/1.16 |
| 2010/0277760 | A1* | 11/2010 | Matsunaga | G06T 1/00 |
| | | | | 358/1.15 |
| 2011/0235077 | A1* | 9/2011 | Ito | G06F 3/121 |
| | | | | 358/1.13 |

FOREIGN PATENT DOCUMENTS

JP  2011-239071 A  11/2011
JP  2014-039181 A  2/2014

* cited by examiner

*Primary Examiner* — Saeid Ebrahimi Dehkordy
(74) *Attorney, Agent, or Firm* — Oliff PLC

(57) ABSTRACT

A print control apparatus includes a reconfigurable circuit that generates print data by reconfiguring a circuit configuration thereof respectively in response to a multiple image processes and performing the image processes on image data successively, and a reduction image generator that performs control to reconfigure the circuit configuration of the reconfigurable circuit in response to the image process, and generates a reduction image from the image data by performing part of the image processes on the image data using software, in response to command information including a generation method of the reduction image, in parallel with the image process performed by the reconfigurable circuit.

10 Claims, 6 Drawing Sheets

PRINT CONTROL APPARATUS, PRINT CONTROL METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-082830 filed Apr. 14, 2014.

BACKGROUND

Technical Field

The present invention relates to a print control apparatus, a print control method, and a non-transitory computer readable medium.

SUMMARY

According to an aspect of the invention, there is provided a print control apparatus. The print control apparatus includes a reconfigurable circuit that generates print data by reconfiguring a circuit configuration thereof respectively in response to each of a multiple image processes and performing the image processes on image data successively, and a reduction image generator that performs control to reconfigure the circuit configuration of the reconfigurable circuit in response to the image process, and generates a reduction image from the image data by performing part of the image processes on the image data using software, in response to command information including information related to a generation method of the reduction image, in parallel with the image process performed by the reconfigurable circuit.

BRIEF DESCRIPTION OF THE DRAWINGS

Exemplary embodiments of the present invention will be described in detail based on the following figures, wherein.

DETAILED DESCRIPTION

Figure 1:
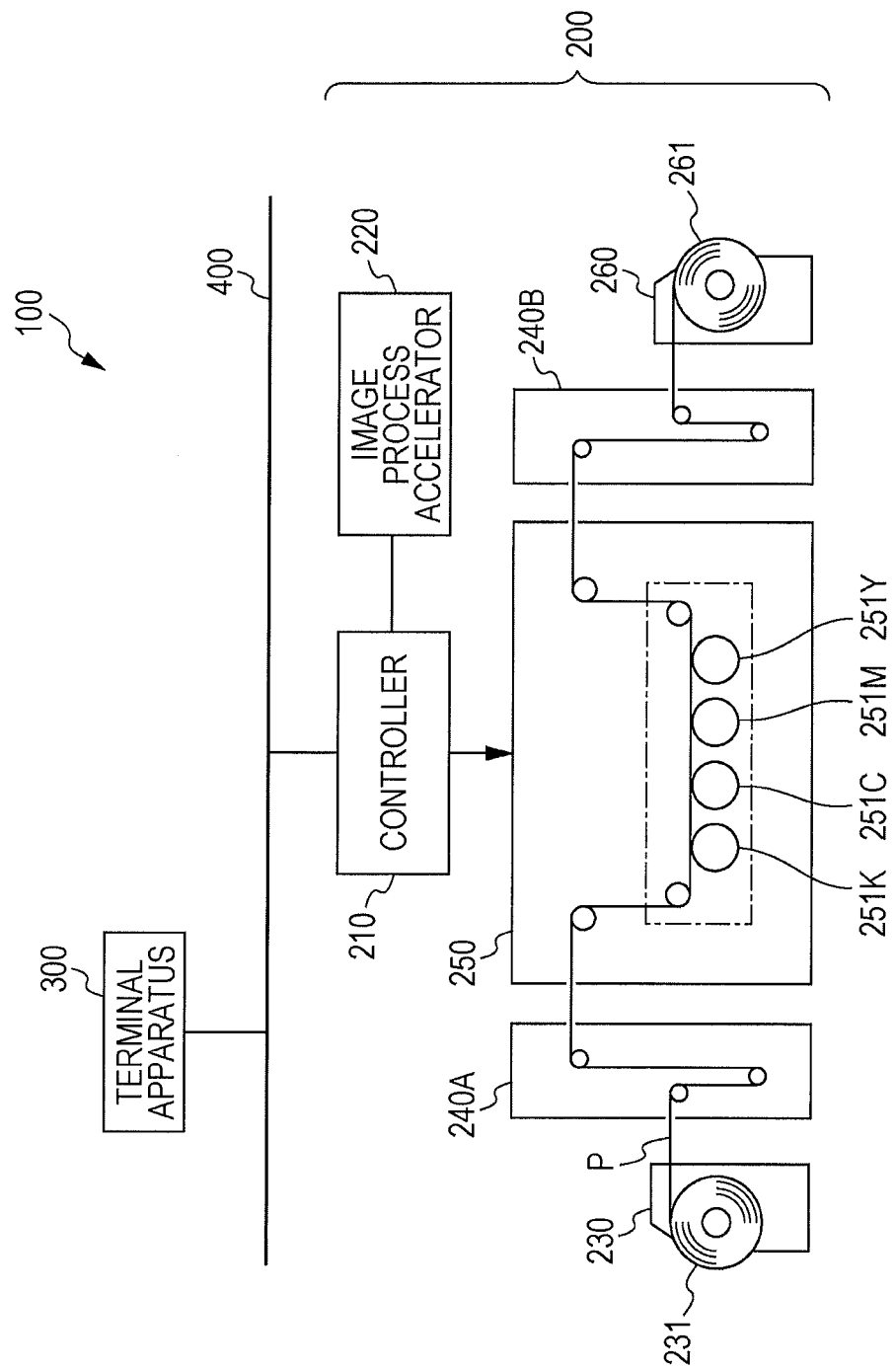
FIG. 1 illustrates an example of the configuration of an image forming system of an exemplary embodiment.

An exemplary embodiment of the present invention is described with respect to the drawings. In each of the drawings, elements having similar functions are designated with the same reference numerals, and the discussion thereof is not duplicated.

FIG. 1 illustrates an example of the configuration of an image forming system 100 of the exemplary embodiment. The image forming system 100 includes an image forming apparatus 200 and a terminal apparatus 300 connected to the image forming apparatus 200 via a network 400, such as a local area network (LAN). The image forming apparatus 200 performs high-speed printing on a continuous paper sheet P, and the terminal apparatus 300 includes a personal computer (PC) that transfers a print job to the image forming apparatus 200.

The image forming apparatus 200 includes a controller 210, an image process accelerator 220, a pre-processing device 230, a printer 250, a post-processing device 260, and buffer devices 240A and 240B. The controller 210, connected to the network 400, and generally controls the image forming apparatus 200. The image process accelerator 220, connected to the image process accelerator 220, increases a process speed of the controller 210, in particular, the process speed related to image processing. The pre-processing device 230 pays out the continuous paper sheet P wound around a payout roller 231. The printer 250 prints an image on the continuous paper sheet P. The post-processing device 260 winds up the continuous paper sheet P having the image printed thereon on a takeup roller 261. The buffer devices 240A and 240B are respectively arranged between the pre-processing device 230 and the printer 250, and between the printer 250 and the post-processing device 260. The image process accelerator 220 is an example of a print control apparatus.

The printer 250 includes image forming units 251K, 251C, 251M, and 251Y configured to form black (K), cyan (C), magenta (M), and yellow (Y) color images on the continuous paper sheet P through an electrophotographic system.

Figure 2:
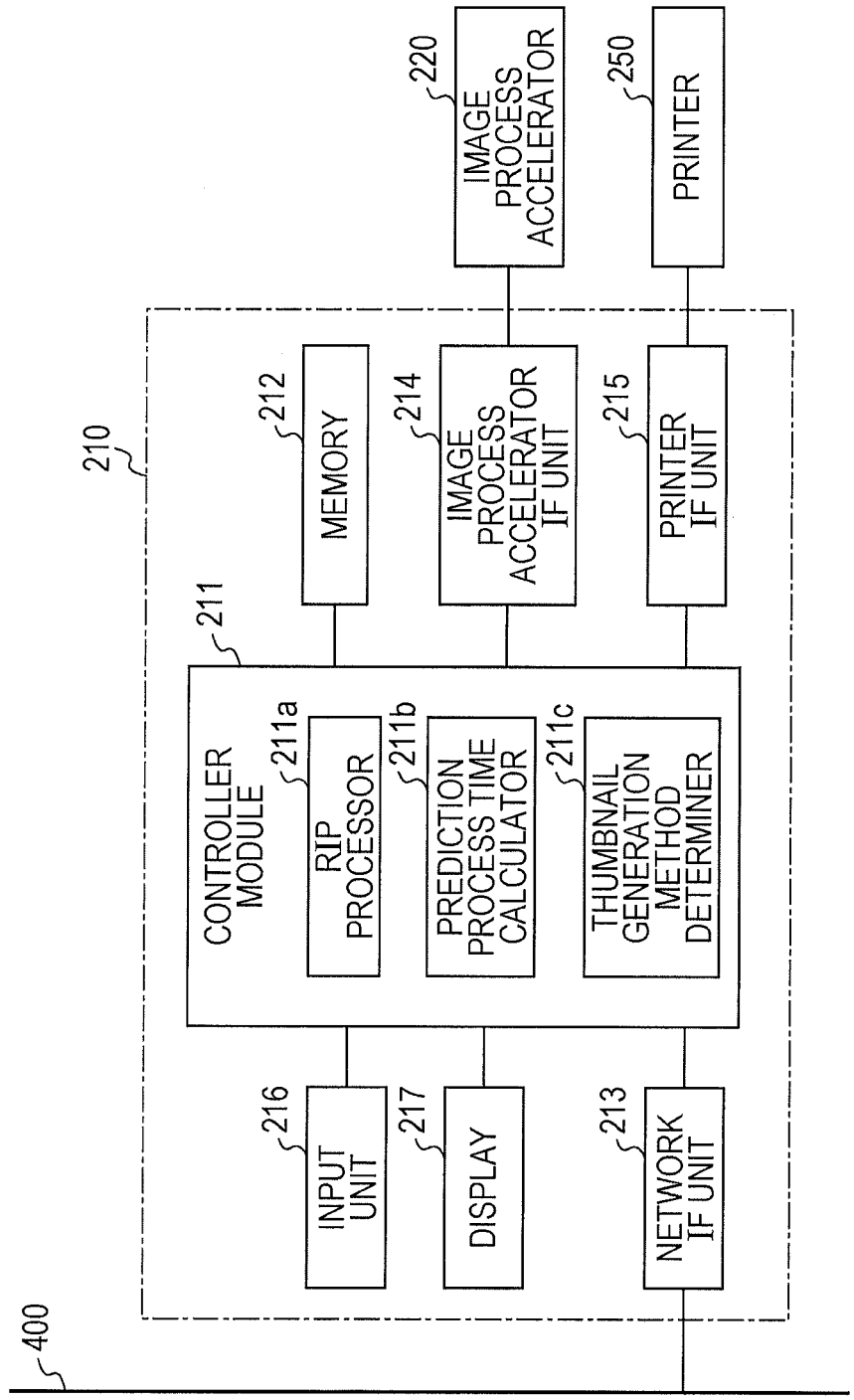
FIG. 2 is a block diagram illustrating an example of the configuration of a controller.

FIG. 2 is a block diagram illustrating an example of the configuration of the controller 210. The controller 210 includes a controller module 211, a memory 212, a network interface (IF) unit 213 connected to the network 400, and configured to transmit and receive information to and from the terminal apparatus 300, an image process accelerator IF unit 214 configured to transmit and receive information to and from the image process accelerator 220, a printer IF unit 215 configured to transmit and receive data to and from the printer 250, an input unit 216, and a display 217.

The controller module 211 includes a raster image processor (RIP) 211a, a prediction process time calculator 211b, and a thumbnail generation method determiner 211c. The controller module 211 includes a central processing unit (CPU), and executes a program thereof, thereby functioning as the RIP processor 211a, the prediction process time calculator 211b, the thumbnail generation method determiner 211c, and the like.

The CPU of the controller module 211 receives via the image process accelerator IF unit 214 print data and thumbnail generated by the image process accelerator 220. The CPU of the controller module 211 displays the thumbnail on the display 217 and controls the printer IF unit 215 to transmit the print data to the printer 250. The thumbnail is image data that is obtained by performing a reduction process on an original image (a raster image in the exemplary embodiment). The thumbnail is an example of the reduction image.

The prediction process time calculator 211b acquires a data size and image process command information from page description language (PDL) data, and calculates prediction process time the image process accelerator 220 takes to generate the print data from the raster image data based on the data size and the image process command information.

The thumbnail generation method determiner 211c determines the generation method of the thumbnail that satisfies the condition that the time to generate the thumbnail does not exceed the prediction process time calculated by the prediction process time calculator 211b. More specifically, the thumbnail generation method determiner 211c determines the generation time of the thumbnail based on the data size acquired by the prediction process time calculator 211b, the image process command information, interrupt process time, and process time of the generation method. The thumbnail generation method determiner 211c then determines the generation method of the thumbnail so that the condition of the prediction process time>the generation time of the thumbnail holds.

The memory 212 includes a read-only memory (ROM), a random-access memory (RAM), a hard disk drive (HDD), and the like, and stores the program of the CPU. The CPU controls the elements of the image forming apparatus 200 in accordance with the program stored on the memory 212.

The RIP processor 211a performs raster image processing (RIP) to convert PDL data of each of the R, G, and B colors into bitmap image data of each of Y, M, C, and K colors, namely, raster image data. The RIP processor 211a may output an edge list, such as data in an intermediate language data format, converted from the PDL data. In such a case, the image process accelerator 220 receives and converts the intermediate language data as an example of the original image into the raster image data, and then converts the raster image data into the print data. The color space of the raster image data output by the RIP processor 211a is not limited to the YMCK. The color space of the raster image data may be the RGB.

The network IF unit 213 receives a print job from the terminal apparatus 300 via the network 400.

The image process accelerator IF unit 214 transmits the raster image data, generated by the RIP processor 211a, together with a process request to the image process accelerator 220. The process request includes an image process start command, and a thumbnail generation start command. The thumbnail generation start command includes information related to the thumbnail generation method determined by the thumbnail generation method determiner 211c. The image process accelerator IF unit 214 receives the print data and the thumbnail from the image process accelerator 220.

The printer IF unit 215 transmits the print data transmitted from the image process accelerator 220 to the printer 250.

The input unit 216 includes a keyboard, a mouse, and the like. The display 217 includes a liquid-crystal display that displays information, such as the thumbnail.

Figure 3:
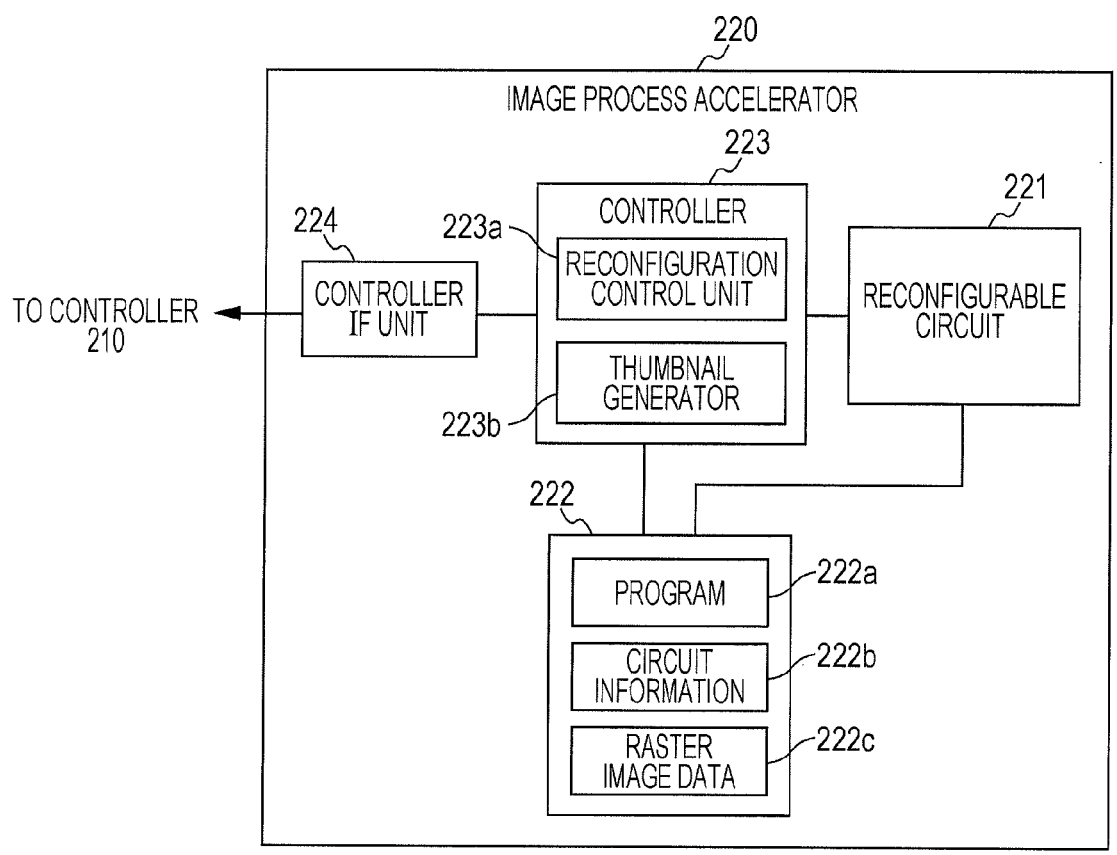
FIG. 3 is a block diagram illustrating an example of the configuration of an image process accelerator.

FIG. 3 is a block diagram illustrating an example of the configuration of the image process accelerator 220. The image process accelerator 220 includes a reconfigurable circuit 221 that is reconfigurable in circuit configuration, a memory 222 that stores a variety of information, a controller 223 that controls the elements of the image process accelerator 220, and a controller IF unit 224 that receives and transmits information from and to the controller 210. The reconfigurable circuit 221, the memory 222, the controller 223, and the controller IF unit 224 are an example of elements forming a computer. The reconfigurable circuit 221, the controller 223, and the controller IF unit 224 may be implemented using a single processor (such as a dynamic reconfigurable processor (DAPDNA)(registered trademark)).

The reconfigurable circuit 221 reconfigures a circuit thereof in response to an image process, and performs multiple image processes successively. The reconfigurable circuit 221 thus generates the print data. The reconfigurable circuit 221 includes a number of logical circuit elements, and is enabled to reconfigure a connection relationship between the logical circuit elements.

The reconfigurable circuit 221 may include a dynamically reconfigurable large scale integration (LSI), such as a distributed network architecture (DNA) (part of the DAPDNA processor), or a field programmable gate array (FPGA). From among the dynamic reconfigurable LSIs, DNA is an array of a number of processing elements (PEs), and the connection between the PEs is reconfigured at a high speed (within one clock, for example) in accordance with configuration data.

The "multiple image processes" to be executed by the reconfigurable circuit 221 include a color conversion process, a gamma correction process, a screen process, a filtering process, and a calibration process. In the color conversion process, data is converted from one YMCK color space to another YMCK space to correct the color tone of YMCK mixed colors using a 4-dimensional conversion table (hereinafter referred to as "4D-lookup table (LUT)"), or single color gradation characteristics of each of the YMCK colors are corrected using a 1-dimensional conversion table (1D-LUT). In the gamma correction process, brightness is adjusted using the 4D-LUT or the 1D-LUT. In the screen process, pseudo halftone processing, such as a dithering process, is performed. In the pseudo halftone processing, the original image information is converted into image information in lower bit-level gradation than in the original image information. In the filtering process, sharpness correction is performed. The calibration process is a color correction process that adjusts a color tone between an input device and an output device in accordance with the 4D-LUT or the 1D-LUT. From among the image processes, the color conversion process, the gamma correction process, and the filtering process visually affect the thumbnail. The thumbnail visually similar to the print data is obtained by generating the thumbnail through one of the color conversion process, the gamma correction process, and the filtering process. The 1D-LUT is typically determined by referencing output data responsive to input data in a table. The 1D-LUT involves an amount of computation that is lower than the 3D-LUT or the 4D-LUT in which an interpolation process is performed after determining a grid point. The 1D-LUT also involves computation time shorter than the 3D-LUT or the 4D-LUT. In the filter process as well, the 1D-LUT is lower in computation amount and shorter in computation time than the 3D-LUT or the 4D-LUT.

The memory 222 stores a program 222a that causes the controller 223 to operate, circuit information 222b responsive to a series of image processes used to reconfigure the circuit of the reconfigurable circuit 221, and raster image data 222c. The memory 222 is a dynamic random-access memory (DRAM), for example.

The controller 223 controls the reconfigurable circuit 221 to reconfigure the circuit configuration of the reconfigurable circuit 221 in response to the image process. In response to a command (command information) indicating the generation method of the thumbnail from the controller 210, the controller 223 executes part of multiple image processes on the raster image data using software, and thus generates the thumbnail from the raster image data.

The controller 223 includes a reconfiguration control unit 223a that controls the reconfiguration of the reconfigurable circuit 221, and a thumbnail generator 223b that generates the thumbnail. The controller 223 may be a reduced instruction set computer (RISC) processor. By executing the program 222a, the controller 223 functions as the reconfiguration control unit 223a and the thumbnail generator 223b. The reconfiguration control unit 223a is an example of a reconfiguration controller. The thumbnail generator 223b is an example of a reduction image generator. Each of the reconfiguration control unit 223a and the thumbnail generator 223b may be implemented using hardware, such as an application specific integrated circuit (ASIC).

The reconfiguration control unit 223a controls the reconfigurable circuit 221 to reconfigure the circuit configuration of the reconfigurable circuit 221 in accordance with the circuit information 222b stored on the memory 222.

In response to the command indicating one of the thumbnail production methods of FIG. 4, the thumbnail generator 223b performs a reduction process to convert the raster image data into the raster image data at a lower resolution. The thumbnail generator 223b generates the thumbnail by performing part of the image processes to be performed by the reconfigurable circuit 221. The reduction process lowers the resolution using a predetermined method, such as the nearest neighbor method or the bilinear method.

The command indicating the generation method transmitted from the controller 210 is determined in such a manner that the generation time of the thumbnail does not exceed the prediction process time the reconfigurable circuit 221 takes to generate the print data from the raster image data.

The controller IF unit 224 receives from the controller 210 the raster image data, a process request, a data transfer start command, and the like, and transmits to the controller 210 the print data, the thumbnail, and a data transfer complete signal.

Figure 4A:
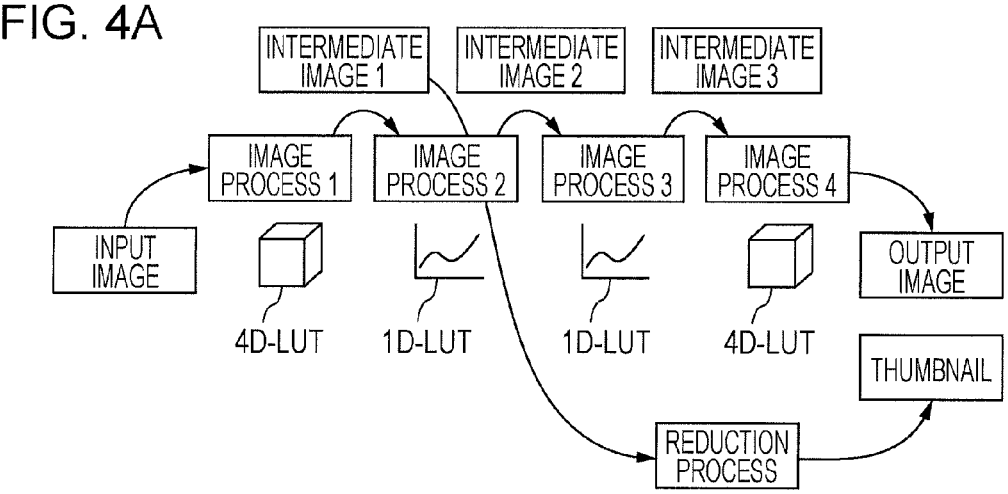
FIG. 4A illustrates a first generation method of thumbnail.
Figure 4B:
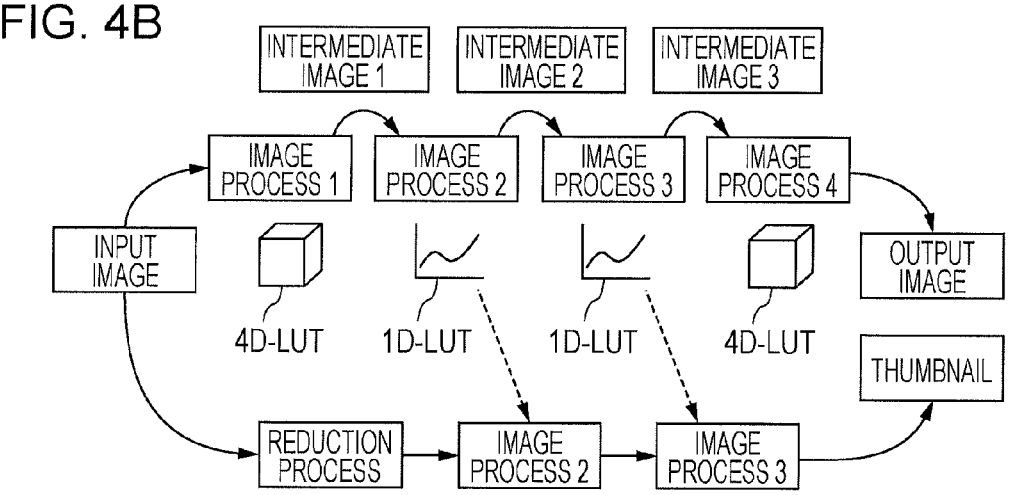
FIG. 4B illustrates a second generation method of thumbnail.
Figure 4C:
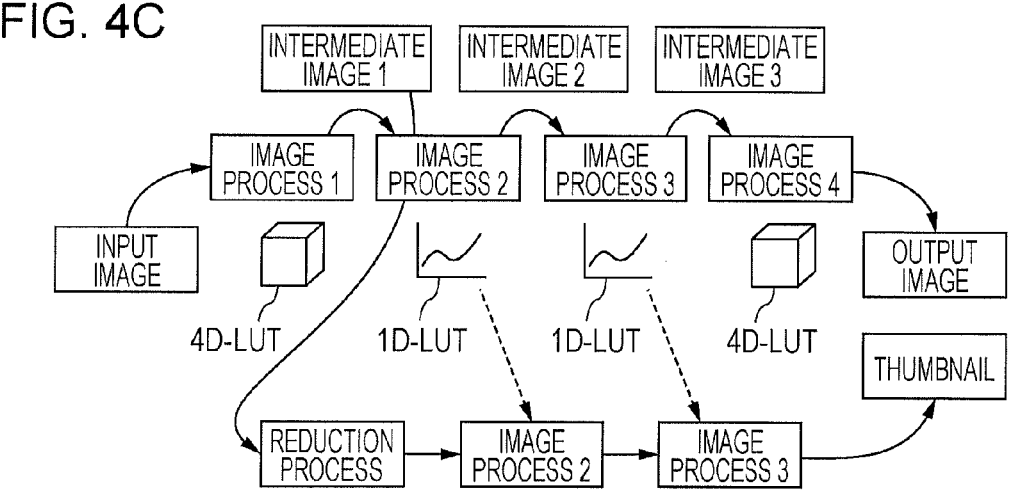
FIG. 4C illustrates a third generation method of thumbnail.

FIG. 4A through FIG. 4C illustrate a variety of generation methods of the thumbnail. FIG. 4A illustrates a first generation method, FIG. 4B illustrates a second generation method, and FIG. 4C illustrates a third generation method.

Referring to FIG. 4A through FIG. 4C, the "input image" and the "output image" respectively represent the raster image data and the print data. Also referring to FIG. 4A through FIG. 4C, the "intermediate image 1", the "intermediate image 2", and the "intermediate image 3" respectively represent results of the "image process 1", the "image process 2", and the "image process 3".

Referring to FIG. 4A through FIG. 4C, the "image process 1", the "image process 2", the "image process 3", and the "image process 4" are performed by the reconfigurable circuit 221. For convenience of explanation, FIG. 4A through FIG. 4C illustrate the four image processes of the multiple image processes to be performed by the reconfigurable circuit 221. The number of image processes to be performed by the reconfigurable circuit 221 is not limited to four. The "image process 1" is a color conversion process using the 4D-LUT, for example. The "image process 2" is the gamma correction process using the 1D-LUT, for example. The "image process 3" is the filtering process, for example. The "image process 4" is the calibration process using the 4D-LUT, for example. The image processes 2 and 3 are examples of image processes that involve a relatively small amount of computation from among the multiple image processes to be performed by the reconfigurable circuit 221.

In the first generation method as illustrated in FIG. 4A, the thumbnail generator 223b performs the reduction process on the intermediate image 1 that is obtained when the reconfigurable circuit 221 performs part (the image process 1 in FIG. 4A through FIG. 4C) of the multiple image processes (the image process 1, image process 2, image process 3, and image process 4 in FIG. 4A through FIG. 4C). The thumbnail generator 223b thus generates the thumbnail. The generation of the thumbnail is performed in parallel with the image process 2, image process 3, and image process 4 performed by the reconfigurable circuit 221. The thumbnail obtained through the first generation method reflects the intermediate results of the color conversion process.

In the second generation method illustrated in FIG. 4B, the thumbnail generator 223b performs the reduction process on the raster image data, and then, the reconfigurable circuit 221 performs the image processes (the image processes 2 and 3 in FIG. 4B) that are faster than the remaining image processes using the 4D-LUT. The thumbnail thus results. The thumbnail thus obtained through the second generation method reflects the results of the gamma correction process and the filtering process. The generation of the thumbnail is performed in parallel with the image process 1, image process 2, image process 3, and image process 4 performed by the reconfigurable circuit 221. The second generation method additionally includes the image process 2 and image process 3 in comparison with the first generation method and thus takes a longer generation time of the thumbnail than the first generation method.

The thumbnail generator 223b may perform the image process 1 through the image process 4 in the order from small to large amount of computation. In this way, the image process that more visually affects the thumbnail is more frequently performed, and a visual difference between the thumbnail and the print data becomes smaller.

The third generation method is a combination of the first generation method and the second generation method. In the third generation method as illustrated in FIG. 4C, the thumbnail generator 223b performs the reduction process on the intermediate image 1 that is obtained when the reconfigurable circuit 221 performs part (the image process 1 in FIG. 4A through FIG. 4B) of the multiple image processes (the image process 1, image process 2, image process 3, and image process 4 in FIG. 4A through FIG. 4C). The thumbnail generator 223b then performs the image process 2 and image process 3 to generate the thumbnail. The generation of the thumbnail is performed in parallel with the image process 2, image process 3, and image process 4 performed by the reconfigurable circuit 221. The thumbnail obtained through the third generation method reflects the results of the color conversion process, the gamma correction process, and the filtering process. The third generation method additionally includes the image process 1 in comparison with the second generation method and thus takes a longer generation time of the thumbnail than the second generation method.

The determination method of the image process is described below. The image process time on the raster image data is proportional to an amount of computation and a process pixel count. More specifically, given the same number of pixels to be processed, the process time becomes shorter as the amount of computation is smaller. Let Amsec/pix, Bmsec/pix, Cmsec/pix, and Dmsec/pix respectively represent periods of time the reconfigurable circuit 221 takes to perform the image process 1, image process 2, image process 3, and image process 4. Let zmsec/pix, amsec/pix, bmsec/pix, cmsec/pix, and dmsec/pix respectively represent periods of time the controller 223b takes to perform the reduction process, image process 1, image process 2, image process 3, and image process 4.

Let X represent the number of pixels of the input image, and the total time the reconfigurable circuit 221 takes to perform the image process 1, image process 2, image process 3, and image process 4 is $(A+B+C+D)*X$ (msec).

A resolution ratio of the thumbnail to the input image may now be Y (output resolution/input resolution wherein the output resolution is smaller than the input resolution). If the thumbnail generator 223b performs the reduction process, the image process 1, image process 2, image process 3, and image process 4, the processes to be performed are selected so that the relationship $(A+B+C+D)*X > (z+a+b+c+d)*X*Y$ is satisfied.

In the second generation method, when the reconfigurable circuit 221 starts the image process 1, the thumbnail generator 223b starts the reduction process on the input image, and then performs the image process 2 and image process 3. The processes to be performed by the thumbnail generator 223b (the image process 2 and image process 3) are thus selected to satisfy the relationship $(A+B+C+D)*X > (z+b+c)*X*Y$.

In the third generation method, when the reconfigurable circuit 221 starts the image process 2, the thumbnail generator 223b starts the reduction process on the intermediate image 1 as a result of the image process 1, and then performs the image process 3. The process to be performed by the controller 223 (the image process 3) is thus selected to satisfy the relationship $(B+C+D)*X > (z+c)*X*Y$.

The thumbnail generator 223b is caused to perform as many image processes as possible under the condition that the generation time does not exceed the time the reconfigurable circuit 221 takes to generate the print data. The visual difference between the thumbnail and the print data is thus minimized. In the third generation method, the processes to be performed by the thumbnail generator 223b (the image process 2 and image process 3) are thus selected to satisfy the relationship $(B+C+D)*X > (z+b+c)*X*Y$.

It is more desirable to perform the image process 2 and image process 3 than to perform the image process 4 alone. If it is possible to perform the image process 2 alone or the image process 3 alone, it may be predetermined that one of the image processes (the image process 2, for example) is to be performed with higher priority.

Figure 5:
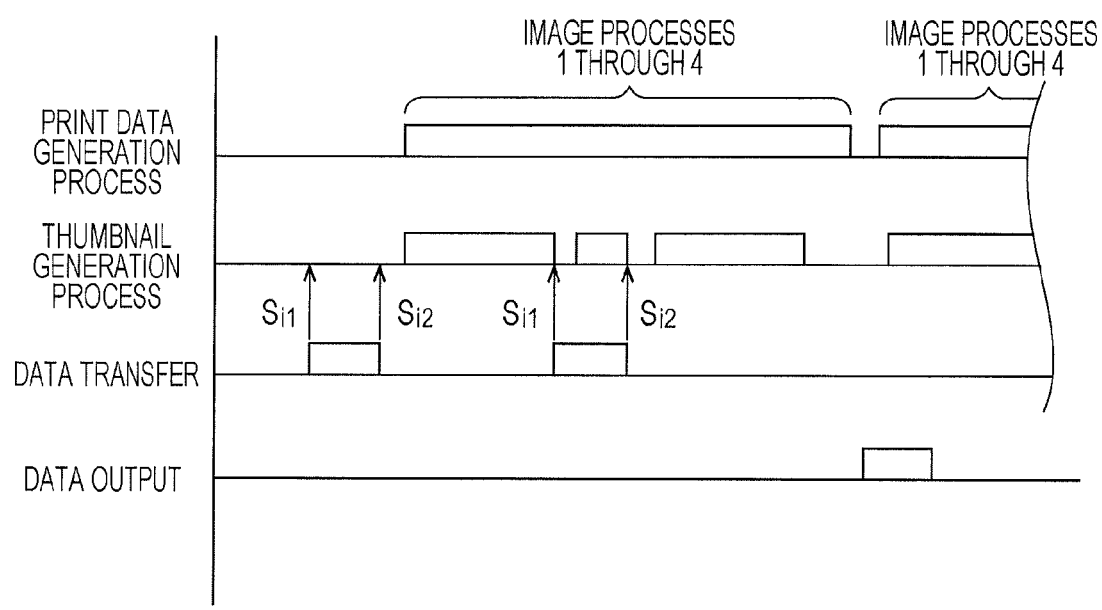
FIG. 5 is a time chart illustrating an example of the operation of the image process accelerator.

An example of the operation of the image forming system 100 is described below. FIG. 5 is a time chart illustrating an example of the operation of the image process accelerator 220.

When the terminal apparatus 300 transmits a print job to the controller 210 via the network 400, the controller 223 in the controller 210 receives the print job from the terminal apparatus 300 via the network IF unit 213. The RIP processor 211a converts the PDL data contained in the print job into the raster image data.

The prediction process time calculator 211b acquires from the PDL data the data size and the image process command information, and then calculates the prediction process time based on the data size and the image process command information.

The thumbnail generation method determiner 211c determines the generation method of the thumbnail under the condition that the time to generate the thumbnail does not exceed the prediction process time calculated by the prediction process time calculator 211b.

The image process accelerator IF unit 214 transmits to the image process accelerator 220 the raster image data, generated by the RIP processor 211a, together with the process request.

Figure 6:
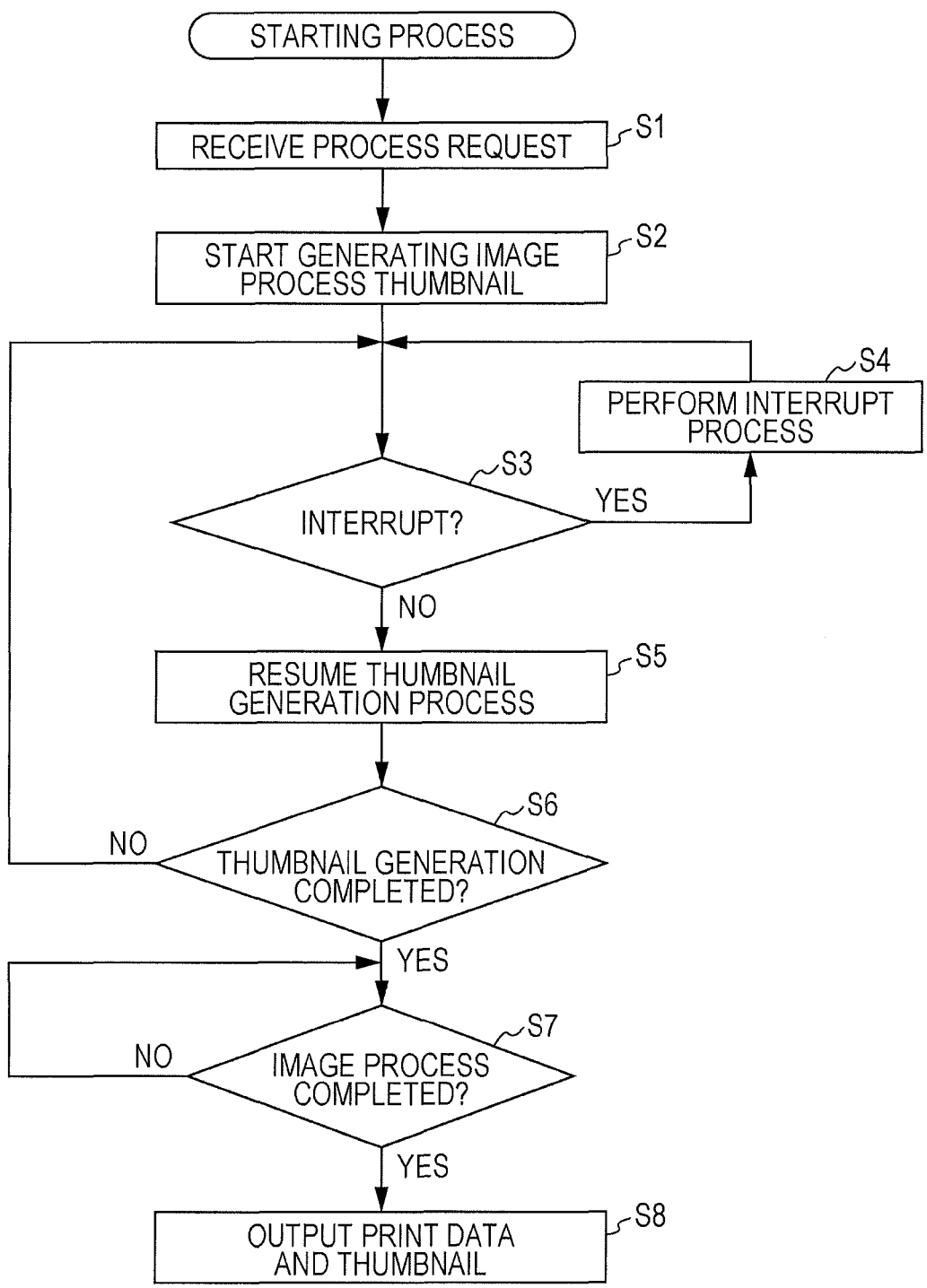
FIG. 6 is a flowchart illustrating an example of the operation of the image process accelerator.

FIG. 6 is a flowchart illustrating an example of the operation of the image process accelerator 220. The controller IF unit 224 in the image process accelerator 220 receives the raster image data and the process request from the controller 210 (S1).

The controller 223 stores the raster image data received by the controller IF unit 224 onto the memory 222. The reconfiguration control unit 223a in the controller 223 performs control to reconfigure the circuit of the reconfigurable circuit 221 in accordance with the circuit information 222b stored on the memory 222 in response to the image process start command contained in the process request. The reconfigurable circuit 221 reconfigured under the control of the reconfiguration control unit 223a starts the image process on the raster image data. The thumbnail generator 223b in the controller 223 starts generating the thumbnail in response to the thumbnail generation start command contained in the process request (S2).

The controller 223 suspends the generation of the thumbnail upon receiving an interrupt signal $S_{i1}$ to a data transfer command from the controller 210 as illustrated in FIG. 5 (yes branch from S3). The controller 223 performs an interrupt process to start the transfer of the raster image data as a next process target from the controller 210 (S4). The thumbnail generator 223b resumes the generation of the thumbnail upon completing the interrupt process (S5). A decrease in the process performance of the print data generation is controlled by setting the priority of the interrupt process to be higher than the thumbnail generation process.

If the controller 223 receives an interrupt signal $S_{i2}$ indicative of the completion of the transfer of the raster image data from the memory 222 (yes branch from S3) prior to the end of the generation of the thumbnail (no branch from S6), the controller 223 interrupts the generation of the thumbnail, and performs the interrupt process to transmit a transfer complete response to the controller 210 (S4). Upon completing the interrupt process, the thumbnail generator 223b in the controller 223 resumes the generation of the thumbnail (S5).

When the generation of the thumbnail is complete (yes branch from S6), the controller 223 waits for the end of the image process (no branch from S7). When the print data is generated subsequent to the end of the image process (yes branch from S7), the controller IF unit 224 transfers the print data and the thumbnail to the controller 210 (S8).

The image process accelerator IF unit 214 in the controller 210 receives the print data and the thumbnail from the image process accelerator 220.

The printer IF unit 215 transmits the print data transmitted from the image process accelerator 220 to the printer 250.

The controller module 211 displays the thumbnail on the display 217. The user verifies the print data currently being printed, by viewing the thumbnail displayed on the display 217. Since the color space of the thumbnail transmitted from the image process accelerator 220 is the YMCK, the controller 210 converts the color space of the thumbnail into the display color space RGB. Since the number of pixels is reduced in the thumbnail more than in the original image, the color space conversion process is performed in a shorter period of time. If the color space conversion process is not performed on the thumbnail by the controller 210, the color space of the raster image data output by the RIP processor 211a may be set to be the RGB.

The printer 250 prints an image responsive to the print data onto the continuous paper sheet P. The continuous paper sheet P having the image printed thereon is wound by the takeup roller 261 in the post-processing device 260.

The present invention is not limited to the exemplary embodiment, and a variety of changes and modifications are possible without departing from the scope of the present invention. For example, the RIP process is performed by the controller 210. Alternatively, the RIP process may be performed by the reconfigurable circuit 221 or the controller 223 in the image process accelerator 220.

In the exemplary embodiment, the image process accelerator 220 includes a single processor and a single memory. Alternatively, the image process accelerator 220 may include multiple processors and multiple memories, of similar type. With this arrangement, the image processes and the generation of the thumbnail may be performed in a distributed fashion, and the print data and the thumbnail may be generated at a higher speed.

The generation method of the thumbnail may be selected depending on the user's purpose for the thumbnail. For example, if the user places a higher priority on the resolution than the color tone, the third generation method, the second generation method, and the first generation method may be selected in this order. Since in such a case, the time for the reduction process becomes shorter in the order of the third generation method, the second generation method, and the first generation method, the resolution of the generated thumbnail becomes lower in the order of the third generation method, the second generation method, and the first generation method.

If the thumbnail fails to be generated using software, the reconfigurable circuit 221 may be used to generate the thumbnail.

In the exemplary embodiment, the program is pre-installed. Alternatively, the program may be supplied in a stored form on a non-transitory computer readable recording medium, such as a compact disk read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiment were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
 a reconfigurable circuit comprising a reconfigurable processor that generates print data by reconfiguring a circuit configuration thereof respectfully in response to each of a plurality of image processes and performing the plurality of image processes on image data successively in a predetermined order; and
 a reduction image generator that performs control to reconfigure the circuit configuration of the reconfigurable circuit in response to a first image process of the plurality of processes, and generates a reduction image from the image data by performing only part of the plurality of the image processes on the image data using software so that the reduction image is created using less than all of the plurality of image processes, in response to command information including information related to a generation method of the reduction image, in parallel with the first image process performed by the reconfigurable circuit so that the part of the plurality of the image processes performed by the software is executed while the plurality of image processes are performed successively in the predetermined order by the reconfigurable circuit.

2. The print control apparatus according to claim 1, wherein the generation method of the reduction image is determined in such a manner that generation time of the reduction image falls within a range not exceeding prediction process time taken to generate the print data from the image data.

3. The print control apparatus according to claim 2, wherein the generation method of the reduction image is selected from among a first generation method that generates the reduction image from intermediate data that the reconfigurable circuit has acquired by performing at least part of the image processes, a second generation method that generates the reduction image from the image data and performs part of the image processes on the reduction image, and a third generation method that generates the reduction image from the intermediate data that reconfigurable circuit has acquired by performing part of the image processes, and performs on the reduction image an image process other than the image process that the reconfigurable circuit has performed.

4. The print control apparatus according to claim 3, wherein the image data is input by a controller that controls a printer that prints the print data onto a recording medium.

5. The print control apparatus according to claim 2, wherein the image data is input by a controller that controls a printer that prints the print data onto a recording medium.

6. The print control apparatus according to claim 1, wherein the generation method of the reduction image is selected from among a first generation method that generates the reduction image from intermediate data that the reconfigurable circuit has acquired by performing at least part of the image processes, a second generation method that generates the reduction image from the image data and performs part of the image processes on the reduction image, and a third generation method that generates the reduction image from the intermediate data that reconfigurable circuit has acquired by performing part of the image processes, and performs on the reduction image an image process other than the image process that the reconfigurable circuit has performed.

7. The print control apparatus according to claim 6, wherein the image data is input by a controller that controls a printer that prints the print data onto a recording medium.

8. The print control apparatus according to claim 1, wherein the image data is input by a controller that controls a printer that prints the print data onto a recording medium.

9. A print control method comprising:
 generating print data by a reconfigurable processor reconfiguring a circuit configuration in response to a plurality of image processes and performing the plurality of image processes on image data successively in a predetermined order; and
 performing control to reconfigure the circuit configuration in response to a first image process of the plurality of image processes, and generating a reduction image from the image data by performing only part of the plurality of image processes on the image data using software so that the reduction image is created using less than all of the plurality of image processes, in response to command information including a generation method of the reduction image, in parallel with the first image process performed so that the part of the plurality of the image processes performed by the software is executed while the plurality of image processes are performed successively in the predetermined order by the reconfigurable processor.

10. A non-transitory computer readable medium storing a program causing a computer to execute a process for controlling printing, the process comprising:

generating print data by a reconfigurable processor reconfiguring a circuit configuration in response to a plurality of image processes and performing the plurality of image processes on image data successively in a predetermined order; and performing control to reconfigure the circuit configuration in response to a first image process of the plurality of image processes, and generating a reduction image from the image data by performing only part of the plurality of image processes on the image data using software so that the reduction image is created using less than all of the plurality of image processes, in response to command information including a generation method of the reduction image, in parallel with the first image process performed so that the part of the plurality of the image processes performed by the software is executed while the plurality of image processes are performed successively in the predetermined order by the reconfigurable processor.

* * * * *